(12) United States Patent
Kanamori et al.

(10) Patent No.: US 8,124,157 B2
(45) Date of Patent: Feb. 28, 2012

(54) NOODLES AND NOODLE SKINS COMPRISING SOYBEAN PROTEIN COMPOSITION AND THE METHOD OF MAKING SAME

(75) Inventors: Jiro Kanamori, Tsukubamirai (JP); Masahiko Samoto, Tsukubamirai (JP); Masaaki Miyamoto, Tsukubamirai (JP)

(73) Assignee: Fuji Oil Company, Limited, Osaka (JP)

( * ) Notice: Subject to any disclaimer, the term of this patent is extended or adjusted under 35 U.S.C. 154(b) by 314 days.

(21) Appl. No.: 12/448,210

(22) PCT Filed: Dec. 12, 2007

(86) PCT No.: PCT/JP2007/073936
§ 371 (c)(1), (2), (4) Date: Jun. 12, 2009

(87) PCT Pub. No.: WO2008/072656
PCT Pub. Date: Jun. 19, 2008

(65) Prior Publication Data
US 2010/0028520 A1   Feb. 4, 2010

(30) Foreign Application Priority Data
Dec. 14, 2006   (JP) .................. 2006-337074

(51) Int. Cl.
A23L 1/16 (2006.01)
(52) U.S. Cl. .......... 426/557; 426/656; 426/634
(58) Field of Classification Search .......... 426/557, 426/656, 634
See application file for complete search history.

(56) References Cited

U.S. PATENT DOCUMENTS

| | | | |
|---|---|---|---|
| 4,120,989 A * | 10/1978 | Grindstaff et al. | 426/577 |
| 6,063,427 A | 5/2000 | Watanabe | |
| 2004/0028799 A1 | 2/2004 | Ishikawa et al. | |
| 2005/0214346 A1 | 9/2005 | Bringe et al. | |
| 2005/0271787 A1 * | 12/2005 | Doud et al. | 426/557 |
| 2006/0062894 A1 * | 3/2006 | Smith et al. | 426/656 |
| 2006/0073252 A1 | 4/2006 | Ishikawa et al. | |

FOREIGN PATENT DOCUMENTS

| | | |
|---|---|---|
| JP | 54-70446 | 6/1979 |
| JP | 54-84048 | 7/1979 |
| JP | 55-165773 | 12/1980 |
| JP | 56-45168 | 4/1981 |
| JP | 60-137256 | 7/1985 |
| JP | 2-409 | 1/1990 |
| JP | 5-76290 | 3/1993 |
| JP | 9-172995 | 7/1997 |
| JP | 2001-292704 | 10/2001 |
| JP | 2002-101835 | 4/2002 |
| JP | 2005-523007 | 8/2005 |
| WO | 02/28198 | 4/2002 |
| WO | 03/022069 | 3/2003 |
| WO | 2004/043160 | 5/2004 |
| WO | 2006/129647 | 12/2006 |
| WO | 2007/026674 | 3/2007 |

OTHER PUBLICATIONS

Kellor. Defatted Soy Four and Grits. 1974. Journal of American Oil Chemist's Society. pp. 77-80.*
Lee et al. JAOCS, vol. 80, No. 1. 2003. pp. 85-90.*
International Search Report issued Jan. 15, 2008 in International (PCT) Application No. PCT/JP2007/073936.
S. Ono, "Shokkan mo Nameraka de Daizushu no Sukunai Namadaizuko no Shinseiho Kaihatsu", Brain Techno News, Mar. 15, 2002, vol. 90, pp. 26-30 with Partial English translation.
J. Kanemori, "Daizu Tanpakushitsu o Shiyo Shita Tanpaku Kyokamen no Chosei to sono Bussei", Nippon Shokuhin Kagaku Kogaku Taikai Koenshu, Sep. 6, 2007, vol. 54, p. 114 with English translation.

* cited by examiner

*Primary Examiner* — Anthony Weier
(74) *Attorney, Agent, or Firm* — Wenderoth, Lind & Ponack, L.L.P.

(57) ABSTRACT

It is intended to prepare noodles and noodle skins, in particular, wheat flour-free noodles and noodle skins, which comprise a soybean protein composition at a high ratio. By adding a water-extracted less denatured soybean protein to noodles and noodle skins, noodles and noodle skins containing a large amount of the soybean protein can be obtained. Further, it is possible to obtain wheat flour-free noodles and noodle skins and starch-free noodles and noodle skins.

20 Claims, No Drawings

NOODLES AND NOODLE SKINS COMPRISING SOYBEAN PROTEIN COMPOSITION AND THE METHOD OF MAKING SAME

This application is a U.S. national stage of International Application No. PCT/JP2007/073936 filed Dec. 12, 2007.

TECHNICAL FIELD

The present invention relates to noodles and noodle skins into which a water-extracted low denatured soybean protein composition is incorporated, and a production method thereof.

BACKGROUND ART

Proteins derived from soybean have a well amino acid balance, and in recent years, physical effects such as an action of decrease in serum cholesterol have been reported. In order to decrease risks of increased cholesterol and cardiac diseases, the U.S. Food and Drug Administration (FDA) recommends ingesting 25 g (6.25 g per serving) or more of a high quality soybean protein in diet for one person per day. Also in Japan, food having a function of lowering serum cholesterol, which contains 6 g or more of soybean globulin for one person per day, has been approved as specified health food.

Soybean protein can be generally ingested from traditional soybean products such as soybean milk, soybean curd, and natto (fermented soybeans). In recent years, in bakery products such as bread and baked goods, beverage or gelled nutrition-balanced foods, and the like, foods added with a soybean protein isolate or soybean protein products such as soybean powder, soybean milk, soybean milk powder, and the like have been largely commercially available and become popular.

However, a general soybean protein isolate used in the food industrial field is subjected to a high temperature and high pressure treatment for sterilization and giving physical properties, and thus heat denaturation is caused. In the case of adding this soybean protein isolate to a dough added with wheat flour or gluten in a low moisture system, since binding capacity is lacking in the soybean protein isolate, the dough easily breaks because of low binding capacity, and the noodle becomes sodden and has texture without toughness after boiling. When an amount of incorporated soybean protein isolate is large, a noodle strip with normal quality can not be obtained and noodle-making properties are poor, and when an obtained noodle is boiled, the noodle breaks in pieces, and thus, a good shape of noodle can not be formed. When an amount of incorporated soybean protein isolate is small, noodle making is possible, but workability and texture tend to deteriorate.

Further, in soybean-based materials such as soybean powder, defatted soybean, and concentrated soybean protein (acid concentrate, alcohol concentrate) containing a large amount of a bean curd refuse component, noodle-making properties are inhibited by fibers derived from the bean curd refuse. Further, when an obtained noodle is boiled, the noodle is sodden and easily breaks in pieces and its texture and taste are also very poor. Improvement methods of physical properties of noodle, using a soybean powder in Patent Documents 1 and 2, using an insoluble soybean protein in Patent document 3 and using soybean milk in Patent Document 4, are disclosed. However, in any of these disclosures, an amount of soybean protein is not more than 5% by weight in a noodle solid content, and a nutritious effect of soybean protein can not be expected. Patent Document 5 describes that a soybean protein isolate can be added up to 30% by weight (23% by weight in a solid content) based on wheat flour in noodle materials by treatment of protein degradation and powderization of O/W emulsion. However, physical properties of obtained dough and noodle can not be considered to be sufficient. Further, adding a larger amount of it can not be applied.

On the other hand, patients with food allergy have been rapidly increased in recent years, and in particular, allergy to grain that is a staple food is serious. Wheat is one of these allergens, and a patient with wheat allergy causes allergic symptoms such as rash, dyspnea, and diarrhea by wheat ingestion. When a patient with celiac syndrome ingests a gluten-containing food, the immune system is reacted because of having no resistance to gluten protein contained in wheat, and inner membrane of the small intestine is damaged to cause nutrient malabsorption.

For such a patient without having resistance to wheat, a food from which wheat, particularly gluten, is removed is necessary, and in Patent Document 6, wheat flour in which gluten is degraded with an enzyme is proposed. However, processing is difficult since gluten is not present, and produced food also has poor texture.

Patent Document 1: JP 54-70446 A
Patent Document 2: JP 54-84048 A
Patent Document 3: JP 56-45168 A
Patent Document 4: JP 55-165773 A
Patent Document 5: JP 60-137256 A
Patent Document 6: JP 9-172995 A

DISCLOSURE OF THE INVENTION

Problems to be Solved by the Invention

An object of the present invention is to provide noodles and noodle skins having high quality of taste, into which a large amount of a soybean protein composition are incorporated.

Means for Solving the Problems

In order to solve the above described problem, the inventors of the present invention have considered that improving binding capacity of soybean protein itself is necessary. As a result of various studies, it has been found that a soybean protein composition having high binding capacity is obtained by increasing a purity of the protein and lowering a denaturation degree thereof. Use of this soybean protein composition having high binding capacity increases noodle-making adequacy and enables to obtain noodles and noodle skins excellent in texture as dough without becoming crumbly. Further, since a soybean protein composition can be incorporated at a high ratio of 25% by weight or more in a solid content, which has been unthinkable, it is not necessary to add wheat, pregelatinized starch and the like as a binder, and also it is possible to produce soybean protein noodles and noodle skins without containing wheat flour and starch in materials. Further, use of various starches in place of wheat flour has enabled to produce noodles having various eating qualities with high quality of taste. The problem has been solved by these findings, and the inventors of the present invention have completed the present invention.

That is, the present invention is:
(1) Noodles and noodle skins, which comprise that a water-extracted low denatured soybean protein composition is incorporated;
(2) The noodles and noodle skins according to (1), wherein the water-extracted low denatured soybean protein composition is incorporated in a ratio of 5% by weight or more in a solid content;

(3) The noodles and noodle skins according to (1), wherein the water-extracted low denatured soybean protein composition is incorporated in a ratio of 25% by weight or more in a solid content;
(4) The noodles and noodle skins according to (3), wherein wheat flour is incorporated in a ratio of 5% by weight or less in a solid content;
(5) A method for producing noodles and noodle skins, which comprise incorporating a water-extracted low denatured soybean protein composition;
(6) A water-extracted low denatured soybean protein composition for noodles and noodle skins;
(7) The noodles and noodle skins according to any one of (1) to (3), wherein the water-extracted low denatured soybean protein composition is a high glycinin soybean protein composition;
(8) The method for producing noodles and noodle skins according to (5), wherein the water-extracted low denatured soybean protein composition is a high glycinin soybean protein composition;
(9) The noodles and noodle skins according to any one of (1) to (3), wherein the water-extracted low denatured soybean protein composition is a high β-conglycinin soybean protein composition;
(10) The method for producing noodles and noodle skins according to (5), wherein the water-extracted low denatured soybean protein composition is a high β-conglycinin soybean protein composition;
(11) The water-extracted low denatured high glycinin soybean protein composition according to (6) for noodles and noodle skins;
(12) The water-extracted low denatured high β-conglycinin soybean protein composition according to (6) for noodles and noodle skins;

Effect of the Invention

According to the present invention, noodles and noodle skins into which a large amount of a soybean protein composition are incorporated can be obtained. Further, noodles and noodle skins without containing wheat flour and noodles and noodle skins without containing starch can also be obtained. They make it possible to easily ingest a soybean protein, and they can also be used as noodles and noodle skins into which no wheat flour is incorporated.

BEST MODE FOR CARRYING OUT THE INVENTION

Hereinafter, the present invention will be explained in detail. The present invention relates to noodles and noodle skins into which a soybean protein composition is incorporated and a production method thereof and further relates to a soybean protein composition for noodles and noodle skins. A soybean protein composition used in the present invention has a binding capacity suitable for noodle-making, and is water-extracted and low-denatured and has a high purity.

A soybean protein composition is a composition containing soybean protein as a main ingredient. Supply forms thereof can be various. It is necessary that it is a water-extracted soybean protein composition of high purity in which protein content is increased more than the soybean material and fiber is removed, such as soybean milk and soybean protein isolate. Specifically, it can be prepared as a soybean milk solution obtained by extracting from soybean materials such as soybean, defatted soybean, and concentrated soybean protein with water or warm water to remove fiber; a protein concentrated solution obtained by separating protein by isoelectric precipitation at pH of about 4 to 5, followed by redissolving, depending on cases; or a dried product obtained by spray drying or freeze-drying of these solutions. In these cases, treatments for the purposes of extraction, concentration, pasteurization, drying, and improvement of physical properties are required to be carried out only under the conditions of temperature, pH, pressure, and the like within the range where soybean protein causes no denaturation.

Extraction conditions of a water-extracted soybean protein composition such as pH, temperature, amount of extracting water, stirring strength, separation method are not particularly limited as long as a necessary amount of soybean protein can be extracted. However, as they are set so that an extraction ratio is lower, a protein purity is higher, and products having higher noodle-making properties can be obtained. For example, the extraction ratio can be lowered by setting a PH as low as the range from 6.5 to 7.0, lowering temperature, decreasing an amount of extraction water, lowering stirring speed, carrying out centrifugation at higher speed, etc., and as a result, a content of oil extracted with a mixed solvent of chloroform and methanol at a ratio of 2 to 1 becomes small, and a water-extracted soybean protein composition with a high protein purity can be obtained. Further, β-conglycinin and glycinin which are obtained by a known fractional treatment can also be used. In addition, partial hydrolysis can also be carried out by an enzyme after extraction.

Within the range where soybean protein causes no denaturation or little denaturation, pasteurization or bacteria elimination can also be carried out by a filter treatment or a mild heat treatment. In order to sterile *Escherichia coli* within the range where soybean protein is not denatured, heating at 60 to 65° C. for about 30 minutes is effective. Since heat stability of the soybean protein is enhanced, it is more preferable to add sodium chloride at a final concentration of 0.3% by weight or more, preferably 0.6% by weight or more in a protein solution before the heating.

In composition of a water-extracted soybean protein composition, a protein content by a Kjeldahl method using a conversion factor of 6.25 is 60% by weight or more, preferably 80% by weight or more in a solid content of the soybean protein composition, and a food fiber content by a Modified Prosky Method is 15% by weight or less, preferably 10% by weight or less in a solid content of the soybean protein composition.

Since β-conglycinin or glycinin have higher noodle-making properties as compared with a general water-extracted soybean protein composition, they are suitable for production of noodles and noodle skins into which a large amount of soybean protein are incorporated. For these β-conglycinin and glycinin, a high β-conglycinin protein composition containing β-conglycinin at 40% or more, preferably 60% or more, more preferably 80% or more, or a high glycinin protein composition containing glycinin at 60% or more, preferably 80% or more, more preferably 90% or more, which are obtained by the fractional method as described above, are suitable. A content of these constituent proteins is defined to be found by dying a gel electrophoresed by SDS-PAGE with Coomassie Brilliant Blue and decoloring, thereafter measuring by a densitometer.

A denaturation degree of soybean protein can be determined by, for example, a size of a heat absorption peak in a differential scanning calorimetric analysis (Journal of the Japanese Society for Food Science and Technology, Vol. 41, No. 10, pp. 676 to 681, 1994). Specifically, in a system in which an aqueous solution prepared by containing 12% by weight of protein as a sample is increased from 20° C. to 120° C. at 2° C./minute, the denaturation degree can be measured as a sum (ΔH) of heat absorptions of a peak derived from β-conglycinin at around 70° C. and a peak derived from glycinin at around 90° C., and a larger value indicates less denaturation of soybean protein.

The water-extracted low denatured soybean protein composition used in the present invention is required to have a ΔH that is a heat absorption with a weight of an aqueous solution containing 12% by weight of protein as a denominator is low denaturation of 0.7 mJ/mg or more. In addition, the ΔH normally does not exceed 1.5 mJ/mg. On the contrary, soybean processed products currently commercially available such as soybean protein isolate and soybean milk, do not indicate a clear heat absorption peak in the above described test since a protein component thereof is heat-denatured in a production step. Further, a soybean protein solution heated at 80° C. for about 30 minutes or a soybean protein solution treated with a strong acid indicates a ΔH of 0.6 mJ/mg or less, and noodles can not be prepared from such soybean protein since binding property thereof is insufficient.

Noodles and noodle skins into which a water-extracted low denatured soybean protein composition is incorporated are desired to incorporate 5% by weight or more, preferably 10% by weight or more of a water-extracted low denatured soybean protein composition in a solid content. Considering that one general serving of noodles is 80 to 100 g (dry weight) and soybean protein of 6 g or more is necessary in one serving based on the standard of FDA and specified health food, less than 5% by weight of a soybean protein composition is somewhat insufficient, and incorporating of 10% by weight or more is preferable, and incorporating of 25% by weight or more is more preferable in view of binding capacity. There is no limit on the incorporating amount of the water-extracted low denatured soybean protein composition, wheat flour and starch may be all replaced with the soybean protein composition.

Noodle without using wheat flour can be prepared when the water-extracted low denatured soybean protein composition in an amount of 25% by weight or more in a solid content is incorporated in the noodle. Noodle can be prepared by containing wheat flour or gluten in an amount of 5% by weight or less, further, 1% by weight or less of main materials, furthermore, without containing wheat flour. In this case, a pH of dough is important and is preferably pH 5 to 6. Low pH makes the dough crumbly and noodles after making become hard. High pH makes noodle without toughness. Since a soybean protein composition generally prepared has a pH around 7, the pH is adjusted using various acids, preferably organic acids such as citric acid, acetic acid, and tartaric acid. In this case, adding salt in an amount of about 1 to 5% by weight based on a solid content can improve crumbliness of dough. On the other hand, when wheat flour or gluten is more than 5% by weight of a main material, even a pH is high, toughness of noodle is hard to be reduced, and additionally, when a pH is 6 or less, smoothness of noodle is insufficient, and thus, it is better to maintain a pH of 6 or more, preferably 7 or more.

As described above, this noodle into which a large amount of a soybean protein composition are incorporated and a low content of wheat flour or wheat gluten can be used for patients, who have intolerance to gluten, with wheat allergic and celiac syndrome.

Further increasing an amount of a water-extracted low denatured soybean protein composition enables to obtain noodle with high protein and low carbohydrate in which wheat flour or starch is reduced to 50% or less, further, 30% or less in a solid content. These noodles and noodle skins can be effectively used for elderly people who are likely to be insufficient in protein intake because of lowering a basal metabolism amount and decreasing energy taken while a necessary protein amount is not largely changed from in their middle age, and a people aimed for diet who desire to repress accumulation of body fat by suppressing carbohydrate intake.

By adding one selected from monosaccharides such as glucose and fructose, disaccharides such as trehalose, sucrose and maltose, oligosaccharides such as raffinose and fructo-oligosaccharide, dextrin, sugar alcohols such as sorbitol and erythritol to these noodles and noodle skins containing a soybean protein composition, binding property of dough can be improved. These saccharides are preferably added in an amount of 1 to 20% by weight in a solid content. When an adding amount is small, functions do not exhibit, and when the adding amount is large, sweetness is strong. Furthermore, salts such as sodium chloride and brine water, gums such as xanthan gum, guar gum, and soybean polysaccharides, emulsifiers such as glycerin fatty acid esters, and the like are added according to necessity. It has been known that noodle-making properties such as physical properties of dough, and texture and loosening property of noodles can be improved by an appropriate addition of gums and emulsifiers.

Dough is prepared by adding water to powder obtained by mixing the above-described materials. An amount of water to be added in this time is adjusted so that the dough has constant hardness. As a soybean protein composition is incorporated in a larger amount, an amount of water to be added is larger. Generally, about 40 to 70% by weight of an amount of water to be added based on the main materials such as wheat flour, starch, and protein is suitable. When damaged starch having high water abruption is largely contained in the materials, or when a sub material having high water absorption such as gums is incorporated, an amount of water to be added may be larger in some cases.

In the present invention, noodles indicate products obtained by forming into noodles by adding water to wheat flour, cereal flour other than wheat flour, starch, and other raw materials and kneading, and are not limited to specific noodles. Examples thereof include wheat noodle, Chinese noodle, buckwheat noodle, Japanese vermicelli (somen and hiyamugi), cold noodle, rice noodle, and pasta. Forms of the noodles are not particularly limited, and examples thereof include raw noodle, boiled noodle, steamed noodle, instant noodle, dry noodle, and frozen noodle. In the present invention, noodle skins indicate products obtained by using wheat flour, cereal flour other than wheat flour, starch, and other materials, adding water and kneading, and rolled into a sheet form, which are used in, for example, Chinese meat-and-vegetable dumplings, won-ton, steamed Chinese pork dumplings, spring rolls, and the like. These noodle skins can give unique texture that is not present in conventional noodle skins by adding a water-extracted low denatured soybean protein composition.

A processing method of noodles is not particularly limited, and general noodle-making methods such as cutting out method, extrusion method and hand pulling method can be carried out under the temperature condition of 100° C. or lower. When an amount of the soybean protein composition is large or an amount of wheat flour is small, a noodle-making by a cutting out method or an extraction method is preferable since noodles are likely to break in a hand pulling method. In the same manner, noodle skins are also formed into a sheet form, and further subjected to cleavage or cutting out according to necessity, which can be carried out under the temperature condition of 100° C. or lower, using a generally used noodle making roll.

Various formed noodles and various shaped noodle skins are soaked in hot water or water directly, or after being refrigerated or dried, and then being subjected to various heat treatments such as boiling, steaming, and electromagnetic heating to serve for a meal. This heating causes denaturation of the blended low denatured soybean protein composition, which results in being away from the above described condition of low denatured soybean protein. However, a low denatured soybean protein composition is an essential requirement only in a step of adding water to powder and making noodle, and the denaturation after noodle-making gives no problem to the present invention.

EXAMPLES

Hereinafter, Examples will be described, but technical concepts of the present invention are not limited to these exemplifications.

Preparation of Water-extracted Low Denatured Soybean Protein Composition

Production Example 1

To defatted soybean, 15-fold amount of water was added, and sodium hydroxide was added to adjust a pH at 7.0, and mixed and extracted, a precipitate was removed by centrifugation, then, a pH was adjusted at 4.5 and protein was precipitated to recover by centrifugation. After adding water, the resultant was neutralized and spray dried at a heat air temperature of 180° C. and an exhaust air temperature of 70° C. to obtain soybean protein isolate A. A protein content of this soybean protein isolate A was 86% by weight and a fiber content was 4% by weight by the above described analysis method. The soybean protein isolate A was dissolved in water so as to be 12% by weight as protein, and when a differential scanning calorimetric analysis from at 20° C. to 120° C. was carried out at 2° C./minute, a transition calorie ΔH was 0.9 mJ/mg.

Preparation of Water-extracted Low Denatured Soybean Protein Composition

Example 1

33 parts by weight of soybean protein isolate A, 67 parts by weight of wheat flour, 5 parts by weight of sodium chloride, 0.9 part by weight of a pH adjuster (citric acid), and 50 parts by weight of water were mixed by a mixer for 5 minutes (soybean protein composition content: 31.2%/dry). Subsequently, the mixture was combined and rolled to form into a noodle strip by a noodle-making machine, thereafter cutting out to have a width of 1.2 mm with a cutting blade to obtain noodle strings. When a tasting test was carried out after boiling for 5 minutes, the noodle strings had preferable texture.

Preparation of Water-extracted Low Denatured Soybean Protein Composition

Production Example 2

In Production Example 1, the neutralized soybean protein composition was treated at a high temperature and high pressure at 120° C. for 6 seconds, and then spray dried to obtain powdery soybean protein isolate B. A protein content of this soybean protein isolate B was 86% by weight. A heat absorption peak of the soybean protein isolate B did not exist in a differential scanning calorimetric analysis, and a transition calorie ΔH was defined to be 0 mJ/mg.

Preparation of Water-extracted Low Denatured Soybean Protein Noodle

Comparative Example 1

A noodle-making test was carried out in the same manner as in Example 1 except that the soybean protein isolate B was used and water was 70 parts by weight in order to conform hardness of dough, dough crumbed up to break and a noodle strip could not formed, and thus noodle-making could not be carried out.

Comparison Between Low Denatured and Denatured Water-extracted Soybean Protein Compositions Examples 2 to 5 and Comparative Example 2 to 5

A noodle-making test was carried out on the soybean protein isolate A and soybean protein isolate B at various blending ratio. Compositions in Table 1 were respectively mixed by hands to make fish meal-like dough, and the dough was combined and rolled by a hand crank pasta machine to form a noodle strip. Further, the noodle strip was cut out to have a width of 1.2 mm with a cutting blade to form noodle strings. In these Examples, an amount of citric acid was changed so as to adjust a pH of dough at 5.5 to 6.0, and an amount of water was adjusted so that hardness of the dough was constant. Noodle-making properties were determined according to whether the noodle strip and noodle strings were produced well or not.

Noodle-making properties were very preferred in a low denatured soybean protein composition (soybean protein isolate A) as Examples 2 to 5. Noodle-making was barely possible with the heat denatured soybean protein composition (soybean protein isolate B) in Comparative Example 2 containing a small amount of a soybean protein composition, but physical properties thereof were poor as compared with the soybean protein isolate A, and noodle-making was difficult in Comparative Examples 3 to 5 containing a large amount of a soybean protein composition.

TABLE 1

Noodle compositions using soybean protein isolates A and B and the test results thereof

| | Kind of soybean protein | Composition (part by weight) | | | | | Soybean protein content (dry %) | Noodle-making properties* |
|---|---|---|---|---|---|---|---|---|
| | | Wheat flour | Soybean protein | Sodium chloride | Citric acid | Water | | |
| Example 2 | Soybean protein isolate A | 90 | 10 | 5 | 0.3 | 40 | 9.5 | ○ |
| Example 3 | Soybean protein isolate A | 70 | 30 | " | 0.8 | 50 | 28.4 | ○ |
| Example 4 | Soybean protein isolate A | 50 | 50 | " | 1.4 | 60 | 47.0 | ○ |
| Example 5 | Soybean protein isolate A | 0 | 100 | " | 2.7 | 70 | 92.9 | ○ |
| Comparative Example 2 | Soybean protein isolate B | 90 | 10 | " | 0.3 | 60 | 9.5 | Δ |
| Comparative Example 3 | Soybean protein isolate B | 70 | 30 | " | 0.8 | 70 | 28.4 | X |
| Comparative Example 4 | Soybean protein isolate B | 50 | 50 | " | 1.4 | 80 | 47.0 | X |
| Comparative Example 5 | Soybean protein isolate B | 0 | 100 | " | 2.7 | 90 | 92.9 | X |

*Noodle-making properties ○: good, Δ: somewhat poor, X: poor

Noodle-making Without Containing Wheat Flour

Examples 6 to 8

A noodle-making test was carried out on the soybean protein isolate A changing a ratio of starch and a soybean protein composition in composition without containing wheat flour. Preparation was carried out in the same manner as in Example 2 with composition in Table 2, and noodle-making properties were determined. In addition, in order to enhance binding capacity of dough, a constant amount of trehalose was incorporated. As a result, dough had sufficient binding capacity in any examples, and noodle-making was possible.

Influence of Heat Treatment

Examples 9 to 12 and Comparative Example 6 to 8

Soybean protein isolate A was dissolved in water so as to be 12% by weight, a heat treatment was carried out in an oil bath at a normal temperature (24° C.) to 100° C. for 30 minutes, and then immediately cooled. After freeze dry, the resultant was pulverized and subjected to a differential scanning calorimetric analysis and a noodle-making test. The noodle-making test was carried out in the composition in Example 1, and amounts of water to be added were 40 parts by weight in Example 9 to 12, 60 parts by weight in Comparative Example 6, and 70 parts by weight in Comparative Examples 7 and 8 so that hardness of dough was constant, and then, preparation of noodle and evaluation were carried out in the same manner as in Example 2.

TABLE 2

Noodle-making compositions without containing wheat flour and the results thereof

| | Composition (part by weight) | | | | | | Soybean protein content (dry %) | Noodle-making properties* |
|---|---|---|---|---|---|---|---|---|
| | Starch* | Soybean protein isolate A | Trehalose | Sodium chloride | Citric acid | Water | | |
| Example 6 | 67 | 33 | 13 | 5 | 0.9 | 40 | 27.8 | ○ |
| Example 7 | 50 | 50 | " | " | 1.3 | 40 | 41.9 | ○ |
| Example 8 | 0 | 100 | " | " | 2.7 | 60 | 82.9 | ○ |

*Waxy corn starch
*Noodle-making properties ○: good, Δ: somewhat poor, X: poor

In addition, measurement of physical properties of the dough was carried out by a penetration break test using an Instron's universal testing machine. A noodle strip rolled to a thickness of 1.2 mm was left overnight at 4° C. After getting back to normal temperature, the noodle strip was passed through a roller with 1.2 mm gap again and cut into 40 mm×40 mm. The dough was placed on a plate having a hole with a diameter of 16 mm, and the same plate with a hole (weight of 1002 g) was placed thereon to be fixed. The dough was penetrated at a speed of 1 mm/sec using a spherical plunger having a diameter of 5 mm, and a displacement of a break point (assuming that a point of being in contact with a sample is 0 point) was obtained as a measured value (stretch of dough). Dough having a larger value was determined as more preferable dough. Physical properties of noodle after boiling were measured after 15 minutes of boiling up using an Instron's universal testing machine after boiling at 100° C. for 5 minutes. Using a wedge-shaped plunger having a width of 0.5 mm, the noodle was compressed to 0.1 mm from a bottom surface at a plunger speed of 0.05 mm/sec, and a load at a break point was obtained as a measured value (hardness of noodle). Noodle having a larger value was determined as good noodle with toughness.

As shown in Table 3, if heating was up to 70° C., a ΔH was 0.8 to 0.9 mJ/mg, and almost no denaturation occurred (Examples 9 to 12). Both of stretch of dough and hardness of noodle were high values and noodle-making properties were also good. On the other hand, heating at 80° C. or more was carried out, a ΔH was 0.5 mJ/mg or less, which was determined that protein as denatured (Comparative Examples 6 to 8). In this case, stretch of dough was small and the dough easily broke, a measured value of noodle hardness was small and texture was no toughness, and noodle-making properties were also determined to be poor.

concentrate was prepared. At each pH of 3.0 (Example 13), 2.5 (Comparative Example 9) and 2.0 (Comparative Example 10), the defatted soybean was extracted twice with 4-fold amount of water and centrifuged, and the obtained supernatant was neutralized with NaOH, freeze dried and then pulverized. Protein contents of the obtained soybean protein compositions were 74% by weight in Example 13 (soybean protein isolate C), 73% by weight in Comparative Example 9 (soybean protein isolate D), and 73% by weight in Comparative Example 10 (soybean protein isolate E).

Considering a protein content and a sodium chloride content in each soybean protein composition, a noodle-making test was carried out with composition containing 67 parts by weight of wheat flour, 39 parts by weight of the soybean protein C, 1 part by weight of sodium chloride, and 0.9 part by weight of citric acid (36.1% by weight of content of soybean protein composition) in Example 13, and composition containing 67 parts by weight of wheat flour, 40 parts by weight of the soybean proteins D and E, 1 part by weight of sodium chloride, and 0.9 part by weight of citric acid (36.7% by weight of content of soybean protein composition) in Comparative Examples 9 and 10. Amounts of water to be added were set in an amount of 50 parts by weight in Example 13, 60 parts by weight in Comparative Example 9, and 70 parts by weight in Comparative Example 10 so that hardness of dough was constant. Preparation of noodle and evaluations were carried out in the same manner as in Example 9.

As shown in Table 4, a ΔH was 0.9 mJ/mg in extraction at pH 3.0, and almost no denaturation occurred (Example 13). In this case, stretch of dough and hardness of noodle were both good, and noodle-making properties were also determined to be good. When extraction was carried out at pH 2.5 or less, a ΔH was 0.3 mJ/mg or less, and protein was determined to be denatured (Comparative Examples 9 and 10). In this case, stretch of dough was small and the dough easily broke, a measured value of the hardness of noodle was small to thus have texture without toughness, and noodle-making properties were also determined to be poor.

TABLE 3

Noodle-making properties of soybean protein composition subjected to heat treatment

| | Heating temperature (° C.) | ΔH (mJ/mg) | Denaturation | Streach of dough (mm) | Hardness of Noodle (gf) | Noodle-making properties* |
|---|---|---|---|---|---|---|
| Example 9 | 24 | 0.8 | Low | 16.3 | 118.2 | ○ |
| Example 10 | 40 | 0.9 | Low | 14.1 | 111.8 | ○ |
| Example 11 | 60 | 0.9 | Low | 15.4 | 110.5 | ○ |
| Example 12 | 70 | 0.9 | Low | 14.9 | 99.0 | ○ |
| Comparative Example 6 | 80 | 0.5 | Moderate | 8.1 | 31.4 | X |
| Comparative Example 7 | 90 | 0.3 | High | 6.8 | 21.1 | X |
| Comparative Example 8 | 100 | 0 | High | 6.3 | 17.6 | X |

*Noodle making properties ○: good, Δ: somewhat poor, X: poor

Preparation of Soybean Protein Composition Changed in Extraction pH

Example 13 and Comparative Examples 9 and 10

Defatted soybean was washed with 5-fold amount of a diluted hydrochloric acid solution at a pH of 4.2, and an acid

TABLE 4

Noodle-making properties of soybean protein composition extracted by changing pH

| | Extraction pH | ΔH (mJ/mg) | Denaturation | Stretch of dough (mm) | Hardness of noodle (gf) | Noodle-making properties* |
|---|---|---|---|---|---|---|
| Example 13 | 3.0 | 0.9 | Low | 12.3 | 91.3 | ○ |
| Comparative Example 9 | 2.5 | 0.3 | High | 6.9 | 44.5 | X |
| Comparative Example 10 | 2.0 | 0.2 | High | 7.5 | 38.0 | X |

*Noodle making properties ○: good, Δ: somewhat poor, X: poor

Influence of pH of Dough

Examples 14 to 17

A noodle making test was carried out by changing a pH at the time of noodle-making in composition without containing wheat flour, using soybean protein isolate A. 67 parts by weight of starch (waxy corn starch), 33 parts by weight of the soybean protein A, 13 parts by weight of trehalose, 5 parts by weight of sodium chloride, and 40 parts by weight of water were mixed, and citric acid was further added by composition in Table 5. These were respectively mixed by hands to form fish meal-like dough, and the dough was combined and rolled by a hand crank pasta machine to form a noodle strip. Further, the noodle strip was cut out to have a width of 1.2 mm with a cutting blade to form noodle strings. When a pH of dough was varied from 4.8 to 7.2, pH 5.5 in Example 15 was particularly good.

TABLE 5

Noodle-making properties of soybean protein composition formed into noodle by changing pH

| | Citric acid amount | Dough pH | Noodle-making properties* | State |
|---|---|---|---|---|
| Example 14 | 2 | 4.8 | Δ | Dough is crumbly and noodle is hard |
| Example 15 | 0.9 | 5.5 | ○ | good |
| Example 16 | 0.4 | 6.2 | Δ | Somewhat poor toughness |
| Example 17 | 0 | 7.2 | Δ | Somewhat poor toughness |

*Noodle making properties ○: good, Δ: somewhat poor, X: poor

Preparation of Low Denatured Soybean Milk Powder

Production Example 3

To defatted soybean, 10-fold amount of water was added, and mixed and extracted, and a precipitate was removed by centrifugation, and then the resultant was spray dried at a heat air temperature of 180° C. and an exhaust air temperature of 70° C. to obtain soybean milk powder A. According to the above described analysis method, a protein content of this soybean milk powder A was 62% by weight, and a fiber content was 5% by weight.

Noodle-making Using Soybean Milk Powder and Defatted Soybean

Example 18 and Comparative Example 11

To 100 parts by weight of the soybean milk powder A, 13 parts by weight of trehalose, 5 parts by weight of sodium chloride, 1.1 parts by weight of citric acid, and 60 parts by weight of water were added and mixed by hands to form fish meal-like dough, and the dough was combined and rolled by a hand crank pasta machine to form a noodle strip. Further, the noodle strip was cut out to have a width of 1.2 mm with a cutting blade to form noodle strings, and then boiled at 100° C. for 5 minutes (Example 18). Further, defatted soybean powder (protein content of 51% by weight, fiber content of 20% by weight) was used in place of the soybean milk powder A, dough was prepared and formed noodle strings in the same manner as in Example 18, and then boiled at 100° C. for 5 minutes (Comparative Example 11). Noodle was obtained from the soybean milk powder A in Example 18; on the contrary, in Comparative Example 11 of defatted soybean powder, noodle got swollen and broke into pieces, and noodle-making properties were remarkably poor.

Preparation of Water-extracted Low Denatured Pasteurized Soybean Protein Composition Production Example 4

To a neutralized soybean protein composition solution (11% of solid content weight) in Production Example 1, sodium chloride having a final concentration of 0.7% by weight was added and treated at 62 to 64° C. for 45 minutes, and then the resultant was spray dried at a hot air temperature of 180° C. and an exhaust air temperature of 70° C. to obtain powdery soybean protein isolate F. A protein content of this soybean protein isolate F was 86% by weight. The soybean protein isolate F had a transition calorie ΔH of 0.9 mJ/mg in a differential scanning calorimetric analysis. An oil content measured by extracting with reflux for 30 minutes with a mixed solvent of chloroform and methanol at a ratio of 2 to 1 was 5.4% by weight.

Preparation of Water-extracted Low Denatured Pasteurized Soybean Protein Noodle

Example 19

A noodle-making test was carried out in the same manner as in Example 1 by composition in Table 6 using the soybean protein isolate F. The texture was good.

TABLE 6

Noodle-making composition

| | Composition (part by weight) |
|---|---|
| Wheat flour | 35 |
| Soybean protein | 35 |
| Starch | 30 |
| Sodium chloride | 1 |
| Water | 43 |

Preparation of Water-extracted Low Denatured Refined Soybean Protein Composition Production Example 5

To defatted soybean, 10-fold amount of water was added, and sodium hydroxide was added to adjust a pH to 6.7, and mixed and extracted at 50° C., and a precipitate was removed by centrifugation and then further centrifuged at 6850×g to obtain clarified soybean milk. Protein was precipitated by adjusting a pH to 4.5 and recovered by centrifugation. After adding water, the protein was further centrifuged and thereby washed. Water was added again and neutralized, and thereto was added sodium chloride having a final concentration of 0.7% by weight, the resultant was treated at 62 to 64° C. for 45 minutes, thereafter spray drying at a hot air temperature of 180° C. and an exhaust air temperature of 70° C. to obtain powdery soybean protein isolate G. A protein content of this soybean protein isolate G was 86% by weight, and an oil content measured by extracting with reflux for 30 minutes with a mixed solvent containing chloroform and methanol at a ratio of 2 to 1 was 2.8% by weight.

Preparation of Water-extracted Low Denatured Refined Soybean Protein Noodle

Example 20

When a noodle-making test was carried out in the same manner as in Example 19, using soybean protein isolate G in place of soybean protein isolate F, the obtained noodle had toughness, smoothness, and further good texture as compared with Example 19.

Preparation of High Glycinin Soybean Protein Composition and High β-conglycinin Soybean Protein Composition Production Example 6 and 7

To 10 kg of defatted soybean, 1.5 kg of 70% ethanol was sprayed while being mixed, and held at 70° C. for 30 minutes. To this ethanol-treated defatted soybean, 8-fold amount of water was added, and sodium hydroxide was added to adjust a pH to 7.7, and mixed and extracted. A precipitate was removed by centrifugation, and then, water on 5-fold amount of the defatted soybean was further added to the residue and treated in the same manner to obtain an extraction solution. To the extraction solution, sodium hyposulfite on 0.15% by weight of ethanol-treated defatted soybean was added, sulfuric acid was added to adjust a pH to 5.8, and centrifugation was carried out to respectively recover a precipitate and a supernatant. Water was added to the recovered precipitate and centrifugation was carried out again to wash and recover the precipitate. To the precipitate, water was added again, sodium hydroxide was added to neutralize to pH 7.5, thereafter spray drying at a hot air temperature of 185° C. and an exhaust air temperature of 75° C. to obtain a high glycinin soybean protein powder (Production Example 6). Composition of protein in SDS-PAGE of this product had a glycinin content of 93% per protein. The recovered supernatant was adjusted a pH to 5.0 with sulfuric acid, and held at 55 to 60° C. for 15 minutes and then readjusted at pH 5.5, and the supernatant was obtained by centrifugation. The supernatant was adjusted a pH to 4.5 with sulfuric acid, and a precipitate was recovered by centrifugation. The resultant was neutralized to pH 7.5 with sodium hydroxide, thereafter spray drying at a hot air temperature of 185° C. and an exhaust air temperature of 75° C. to obtain a high β-conglycinin soybean protein powder (Production Example 7). Composition of protein in SDS-PAGE of this product had a β-conglycinin content of 74% per protein.

Preparation of High Glycinin Soybean Protein Noodle and High β-conglycinin Soybean Protein Noodle Examples 21 and 22

High glycinin powder of Production Example 6 and the high β-conglycinin powder of Production Example 7 were respectively formed into noodle with compositions in Example 1. Amounts of water to be added were set to be 40 parts by weight so that hardness of dough was constant. Physical properties of dough and physical properties of noodle were measured in the same manner as in Example 9.

In Example 21 and Example 22, values of stretch of dough were high and dough states were good as compared with Example 9 that is a normal soybean protein composition. In addition, values of hardness of noodle were also high and noodle had toughness and was good (Table 7).

TABLE 7

Noodle-making properties of high glycinin soybean protein composition and high β-conglycinin soybean protein composition

| | Kind of soybean protein | Stretch of dough (mm) | Hardness of Noodle (gf) | Noodle-making properties* |
|---|---|---|---|---|
| Example 9 | Soybean protein isolate A | 16.3 | 118.2 | ○ |
| Example 21 | High glycinin soybean protein powder | 17.6 | 173.6 | ⊙ |
| Example 22 | High β-conglycinin soybean protein powder | 23.7 | 250.3 | ⊙ |

*Noodle making properties ○: good, ⊙: very good

Production of Frozen Noodle

Example 23

33 parts by weight of soybean protein isolate A, 33.5 parts by weight of wheat flour, 33.5 parts by weight of waxy corn starch, 5 parts by weight of sodium chloride, and 45 parts by weight of water were mixed by a mixer for 15 minutes. Then, the mixture was combined and rolled by a noodle-making machine to form a noodle strip, thereafter cutting out to have a width of 2 mm with a cutting blade to form noodle strings.

After boiling for 5 minutes, the noodle strings were washed with water and frozen by a shock freezer. The frozen noodle was thawed by boiling for 1 to 2 minutes. The evaluation by tasting test was carried out and eating quality was good.

Production of Non-fry Noodle

Example 24

33 parts by weight of soybean protein isolate A, 33 parts by weight of wheat flour, 34 parts by weight of waxy corn starch, 1.5 parts by weight of sodium chloride, 0.3 part by weight of sodium carbonate, 0.3 part by weight of potassium carbonate and 50 parts by weight of water were mixed by a mixer for 15 minutes. Then, the mixture was combined and rolled by a noodle-making machine to form a noodle strip, thereafter cutting out to have a width of 1 mm with a cutting blade to obtain noodle strings. After steaming for 7 minutes, the noodle strings were dried with hot air of 85° C., and non-fry instant noodle was obtained. The evaluation by tasting test was carried out after 5 minutes of adding boiled water, eating quality was good.

Preparation of Boiled Chinese Meat-and-vegetable Dumpling of which Water-extracted Low Denatured Soybean Protein was Incorporated in the Skins Examples 25 to 28

Soybean proteins isolate A or B was mixed by composition in Table 7 described above for 1 minute by a mixer. Then, dough was rolled to have an elongated shape with a thickness of 1 mm by a rolling pin and formed into a circle with φ9 cm. Then, general ingredients of Chinese meat-and-vegetable dumpling were prepared and wrapped in the skin to obtain raw Chinese meat-and-vegetable dumplings. At last, the raw dumplings were placed in boiled up water in a pan and boiled at high heat for 5 minutes to obtain boiled Chinese meat-and-vegetable dumplings. Dough evaluations and evaluations by tasting test were respectively carried out.

TABLE 8

Dumpling dough composition using soybean protein isolate A or B and evaluation thereof

| | Composition | | | | Evaluation | |
|---|---|---|---|---|---|---|
| | Soybean protein isolate | | Wheat | | | Dumpling taste |
| | A | B | flour | Water | Dough state | evaluation |
| Example 25 | 75 | | 225 | 150 | Smooth and homogeneous dough | Smooth surface and good taste |
| Example 26 | 150 | | 150 | 180 | Smooth and homogeneous dough | Smooth surface and good taste |
| Example 27 | 225 | | 75 | 200 | Smooth and homogeneous dough | Smooth surface and good taste |
| Example 28 | 300 | | 0 | 210 | Smooth and homogeneous dough | Smooth surface and good taste |
| Comparative Example 12 | | 75 | 225 | 210 | Rough and inhomogeneous dough | (Impossible to prepare) |
| Comparative Example 13 | | 150 | 150 | 240 | Not formed into dough | (Impossible to prepare) |
| Comparative Example 14 | | 225 | 75 | 260 | Not formed into dough | (Impossible to prepare) |
| Comparative Example 15 | | 300 | 0 | 270 | Not formed into dough | (Impossible to prepare) |

A good noodle skin could be formed from a low denatured soybean protein composition (soybean protein isolate A). A Chinese meat-and-vegetable dumpling with this noodle skin had smooth and unique texture and was very preferred. On the contrary, in Comparative Example using a heat denatured soybean protein composition (soybean protein isolate B), considerably inferior dough was formed or dough could not be prepared, and no Chinese meat-and-vegetable dumpling could be prepared from any dough.

Industrial Applicability

According to the present invention, noodles and noodle skins into which a large amount of a soybean protein composition are incorporated can be provided, which makes it possible to easily ingest a soybean protein. Further, the noodles and noodle skins can also be used as wheat-free noodles and noodle skins for patients with wheat intolerance, which makes it possible to acquire a new market.

The invention claimed is:

1. Noodles and noodle skins, which comprise that a water-extracted soybean protein composition of which a fiber has been removed is incorporated, wherein the water-extracted soybean protein composition has 0.7 mJ/mg or more of ΔH, which is a sum of heat absorptions of a peak derived from β-conglycinin at around 70° C. and a peak derived from glycinin at around 90° C. in a differential scanning calorimetric analysis with a weight of an aqueous solution containing 12% by weight of protein as a denominator, in a system in which the aqueous solution prepared by containing 12% by weight of the water-extracted soybean protein as a sample is increased from 20° C. to 120° C. at 2° C./minute, and wherein a protein content of the water-extracted soybean protein composition by a Kjeldahl method using a conversion factor of 6.25 is 60% by weight or more in a solid content.

2. The noodles and noodle skins according to claim 1, wherein the water-extracted soybean protein composition is incorporated in a ratio of 5% by weight or more in a solid content.

3. The noodles and noodle skins according to claim 1, wherein the water-extracted soybean protein composition is incorporated in a ratio of 25% by weight or more in a solid content.

4. The noodles and noodle skins according to claim 3, wherein wheat flour is incorporated in a ratio of 5% by weight or less in a solid content.

5. A method for producing noodles and noodle skins, which comprises incorporating a water-extracted soybean protein composition of which a fiber has been removed wherein the water-extracted soybean protein composition has 0.7 mJ/mg or more of ΔH, which is a sum of heat absorptions of a peak derived from β-conglycinin at around 70° C. and a peak derived from glycinin at around 90° C. in a differential scanning calorimetric analysis with a weight of an aqueous solution containing 12% by weight of protein as a denominator, in a system in which the aqueous solution prepared by containing 12% by weight of the water-extracted soybean protein as a sample is increased from 20° C. to 120° C. at 2° C./minute, and wherein a protein content of the water-extracted soybean protein composition by a Kjeldahl method using a conversion factor of 6.25 is 60% by weight or more in a solid content.

6. A water-extracted soybean protein composition of which a fiber has been removed for noodles and noodle skins, wherein the water-extracted soybean protein composition has 0.7 mJ/mg or more of ΔH, which is a sum of heat absorptions of a peak derived from β-conglycinin at around 70° C. and a peak derived from glycinin at around 90° C. in a differential scanning calorimetric analysis with a weight of an aqueous solution containing 12% by weight of protein as a denominator, in a system in which the aqueous solution prepared by containing 12% by weight of the water-extracted soybean protein as a sample is increased from 20° C. to 120° C. at 2° C./minute, and wherein a protein content of the water-extracted soybean protein composition by a Kjeldahl method using a conversion factor of 6.25 is 60% by weight or more in a solid content.

7. The noodles and noodle skins according to claim 1, wherein the water-extracted soybean protein composition has a glycinin content of 60% or more per protein.

8. The method for producing noodles and noodle skins according to claim 5, wherein the water-extracted soybean protein composition has a glycinin content of 60% or more per protein.

9. The noodles and noodle skins according to claim 1, wherein the water-extracted soybean protein composition has a β-conglycinin content of 40% or more per protein.

10. The method for producing noodles and noodle skins according to claim 5, wherein the water-extracted soybean protein composition has a β-conglycinin content of 40% or more per protein.

11. The water-extracted soybean protein composition according to claim 6 for noodles and noodle skins, wherein the water-extracted soybean protein composition has a glycinin content of 60% or more per protein.

12. The water-extracted soybean protein composition according to claim 6 for noodles and noodle skins, wherein the water-extracted soybean protein composition has a β-conglycinin content of 40% or more per protein.

13. The noodles and noodle skins according to claim 3, wherein a content of wheat flour in the noodles and noodle skins is 1% by weight or less and a content of gluten in the noodles and noodle skins is 1% by weight or less.

14. The noodles and noodle skins according to claim 13, wherein a pH of the noodles and noodle skins is 5 to 6.

15. The noodles and noodle skins according to claim 14, which further comprise one or more of saccharides selected from the group consisting of monosaccharide, disaccharide, oligosaccharide and sugar alcohol in an amount of 1 to 20% by weight in a solid content.

16. The method for producing noodles and noodle skins according to claim 5, which further comprises:
preparing a dough by adding water to raw material comprising the water-extracted soybean protein composition and then kneading the mixture, and
forming the dough into noodles or noodle skins.

17. The method for producing noodles and noodle skins according to claim 16, wherein the water-extracted soybean protein composition is incorporated in a ratio of 25% by weight or more in a solid content, and a content of wheat flour in the raw material is 1% by weight or less and a content of gluten in the raw material is 1% by weight or less.

18. The method for producing noodles and noodle skins according to claim 17, which further comprises adjusting a pH of the dough to 5 to 6.

19. The method for producing noodles and noodle skins according to claim 18, wherein the raw material comprises one or more of saccharides selected from the group consisting of monosaccharide, disaccharide, oligosaccharide and sugar alcohol in an amount of 1 to 20% by weight in a solid content.

20. The method for producing noodles and noodle skins according to claim 19, wherein the water-extracted soybean protein composition has a glycinin content of 60% or more per protein or a β-conglycinin content of 40% or more per protein.

* * * * *